United States Patent
Yu et al.

(10) Patent No.: US 9,985,538 B2
(45) Date of Patent: *May 29, 2018

(54) OVER CURRENT PROTECTION IN A VARIABLE OUTPUT POWER SUPPLY

(71) Applicant: Dell Products L.P., Round Rock, TX (US)

(72) Inventors: Wei Cheng Yu, New Taipei (TW); Tsung-Cheng Liao, Taoyuan (TW); Merle Jackson Wood, III, Round Rock, TX (US); Yan Yang, Shanghai (CN); Keith J. Kasprzak, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/785,154

(22) Filed: Oct. 16, 2017

(65) Prior Publication Data

US 2018/0054127 A1 Feb. 22, 2018

Related U.S. Application Data

(62) Division of application No. 14/808,184, filed on Jul. 24, 2015, now Pat. No. 9,793,815.

(51) Int. Cl.
| | |
|---|---|
| *H02M 3/335* | (2006.01) |
| *G06F 1/32* | (2006.01) |
| *G06F 1/26* | (2006.01) |
| *H02M 1/32* | (2007.01) |
| *H02M 1/00* | (2006.01) |

(52) U.S. Cl.
CPC ........ *H02M 3/33515* (2013.01); *G06F 1/263* (2013.01); *G06F 1/3287* (2013.01); *H02M 1/32* (2013.01); *H02M 2001/0009* (2013.01)

(58) Field of Classification Search
CPC .......... H02M 3/22; H02M 3/335; H02M 1/32; H02M 2001/0009; G06F 1/26; G06F 1/3287
USPC ...... 363/15, 16, 20, 21.04–21.18, 55, 56.09, 363/56.1, 56.11
See application file for complete search history.

(56) References Cited

U.S. PATENT DOCUMENTS

| | | | | |
|---|---|---|---|---|
| 9,331,588 | B2 * | 5/2016 | Chen ................. | H02M 3/33523 |
| 2010/0238689 | A1 * | 9/2010 | Fei .................... | H02M 3/33523 |
| | | | | 363/21.16 |
| 2014/0029315 | A1 * | 1/2014 | Zhang ............... | H02M 3/33507 |
| | | | | 363/21.13 |

(Continued)

*Primary Examiner* — Alex Torres-Rivera
(74) *Attorney, Agent, or Firm* — Jackson Walker L.L.P.

(57) ABSTRACT

In accordance with embodiments of the present disclosure, a switch mode power supply may include a transformer, a controller configured to generate a periodic switching signal, a switching transistor coupled between a sense node and the transformer, primarily configured to prevent or permit current flow in the transformer primary winding in accordance with the switching signal, a sense resistor coupled to the switching transistor at a sense node, and a limit circuit configured to obtain a voltage of the sense node at a particular point of the switching period as an indicator of the primary winding current, detect a duration of a demagnetizing interval, and generate a limit signal, based on the sense node voltage and the demagnetizing interval, indicating a power supply output current exceeding a limit threshold.

20 Claims, 6 Drawing Sheets

(56) References Cited

U.S. PATENT DOCUMENTS

2015/0023069 A1* 1/2015 Zhu .................. H02M 3/33507
          363/21.16
2016/0226239 A1* 8/2016 Yang ..................... H02M 1/32

* cited by examiner

OVER CURRENT PROTECTION IN A VARIABLE OUTPUT POWER SUPPLY

The present patent application is a divisional of a previously filed patent application, U.S. patent application Ser. No. 14/808,184, filed Jul. 24, 2015, the entirety of which is hereby incorporated by reference.

TECHNICAL FIELD

Disclosed subject matter pertains to switch mode power supplies and, more particularly, variable output power supplies and ensuring compliance with applicable current power limits across all available supply voltages.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. Information handling systems may also include a variety of hardware and software components that may be configured to process, store, and communicate information and may include one or more computer systems, data storage systems, and networking systems.

Information handling systems may be configured to couple to various peripheral devices over a variety of interfaces that support various peripheral bus protocols including peripheral bus protocols that support different acceptable supply voltages. As one non-limiting example, the universal serial bus (USB) power development (PD) protocol supports 5 V, 12 V, and 20 V supply voltages. Compliance with USB PD or any other protocol that supports multiple supply voltages may require a variable output power supply and the information handling system may have to ensure that the variable output power supply is compliant with power, current, and/or voltage limits and safety standards, regardless of which of the available supply voltages was selected.

Implementing a power supply capable of delivering any one of two or more available voltages and ensuring that the power supply complies with limits specified by peripheral bus standards and safety standards increases the complexity of the information system handling system.

SUMMARY

In accordance with the teachings of the present disclosure, disadvantages and problems associated with ensuring compliance with voltage, current, and power requirements and limits imposed by various electrical standards in systems that employ a variable output power supply may be reduced or eliminated.

In accordance with embodiments of the present disclosure, a switch mode power supply may include a transformer, a controller, a switching transistor, a sense resistor, and a limit circuit. The power supply may be a variable output power supply configured to output any one of multiple supported output voltages. The transformer may include a primary winding configured to receive a primary voltage and a secondary winding configured to couple a secondary voltage, induced by the primary voltage, to an output. The controller may be a pulse width modulator controller configured to control a duty cycle of a signal based upon a control voltage or control current. The controller may be configured to generate a switching signal having a switching frequency, f, and a corresponding switching period, Ts. The switching period Ts, which is also referred to herein as the switching cycle, may include an on phase, Ton, during which the switching transistor conducts primary winding current and an off phase, Toff, during which the switching transistor is off to prevent primary winding current.

A control electrode of the switching transistor may be coupled to the controller to receive the switching signal. First and second output electrodes of the switching transistor may be coupled in series between the transformer primary winding and a sense resistor so that primary winding current flows through a current path between the switching transistor output terminals and into the sense resistor when the switching transistor is activated. In this configuration, the sense resistor voltage is indicative of the primary winding current. The sense resistor may be coupled between ground and a sense node so that the sense node voltage, Vcs, indicates the primary winding current.

The limit circuit may be configured to generate a limit signal indicating an output current or other output parameter exceeding a limit threshold. The power supply may be a variable output power supply and, beneficially, the limit circuit may be configured to determine the limit signal without reference to the output voltage or to any other "secondary parameter" i.e., any parameter measurable at or beyond the secondary winding of the transformer. In addition, the limit signal may be determined independent of a voltage across a bulk capacitor coupled to the primary winding.

The limit circuit may include a sense circuit configured to sample the sense node voltage Vcs or another sense node parameter at a particular point of the switching cycle. The limit circuit may further include a demagnetizing circuit configured to signal a demagnetizing interval of the switching period, a modulating circuit configured to multiply or otherwise modulate the sampled value of the sense node parameter in accordance with a duration of the demagnetizing interval, and a comparator configured to compare the output of the modulating circuit with a limit reference value and produce the limit signal as the comparator output.

In at least one non-limiting embodiment in which the sense node parameter is the sense node voltage, the limit circuit is configured to sample or otherwise sense the sense node midpoint voltage, Vcs_m, which refers to the value of Vcs at a midpoint of the Ton phase of the switching cycle and use Vcs_m as the average value of the sense node voltage Vcs to indicate the average value of the primary winding current during a Ton phase to determine the average value of the output current Iout. Recognizing that the average value of the primary winding current during the Ton phase reflects the average value of the output current during the transformer's demagnetizing interval, the limit circuit may detect the demagnetizing interval and generate the limit signal based on Vcs_m and the duration of the demagnetizing interval.

The sense circuit of the limit circuit may be configured to signal the Ton midpoint, referred to herein as Ton/2, by charging a reference capacitor with a first reference current during a first Ton phase and discharging the reference capacitor with a second reference current during a subsequent Ton phase, where a magnitude of the second reference current discharges the reference capacitor twice as fast as the first reference current charged it. The sense node midpoint voltage, Vcs_m, may be coupled to an input of a voltage-controlled current source for the duration of the demagnetizing period and the output of the voltage controlled current source may be configured to charge a capacitor so that the capacitor's voltage reflects the product of Vcs_m and the duration of the demagnetizing interval.

The limit circuit may be configured to signal a beginning of the demagnetizing interval in accordance with a transition of the switching signal at an end of a Ton phase. The end of the demagnetizing interval may be signaled in accordance with either of two events depending upon whether the transformer is operating in a continuous current mode (CCM) or a discontinuous current mode (DCM). The demagnetizing interval end may be signaled by the end of the switching signal Toff phase for CCM operation and by a transient, negative voltage spike or pulse of the switching signal for DCM operation. Although the description of the figures to follow emphasizes a variable output power supply configured as a flyback voltage converter, other embodiments may implement a forward converter.

In accordance with embodiments of the present disclosure, an information handling system may include a processor, storage, accessible to the processor, one or more input/output (I/O) interfaces for communicating with one or more peripheral devices via respective peripheral buses, and a variable output power supply that includes a limit circuit as described above. The I/O interfaces may include a bus controller configured to communicate with one or more external devices via one or more I/O buses powered by the variable output power supply. The I/O bus may support multiple different supply voltages and the bus controller may select a supply voltage for the I/O bus from a group of available supply voltages.

In at least one embodiment, the limit circuit may be provided within a pulse width modulation (PWM) integrated circuit (IC) that includes a PWM controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-8, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
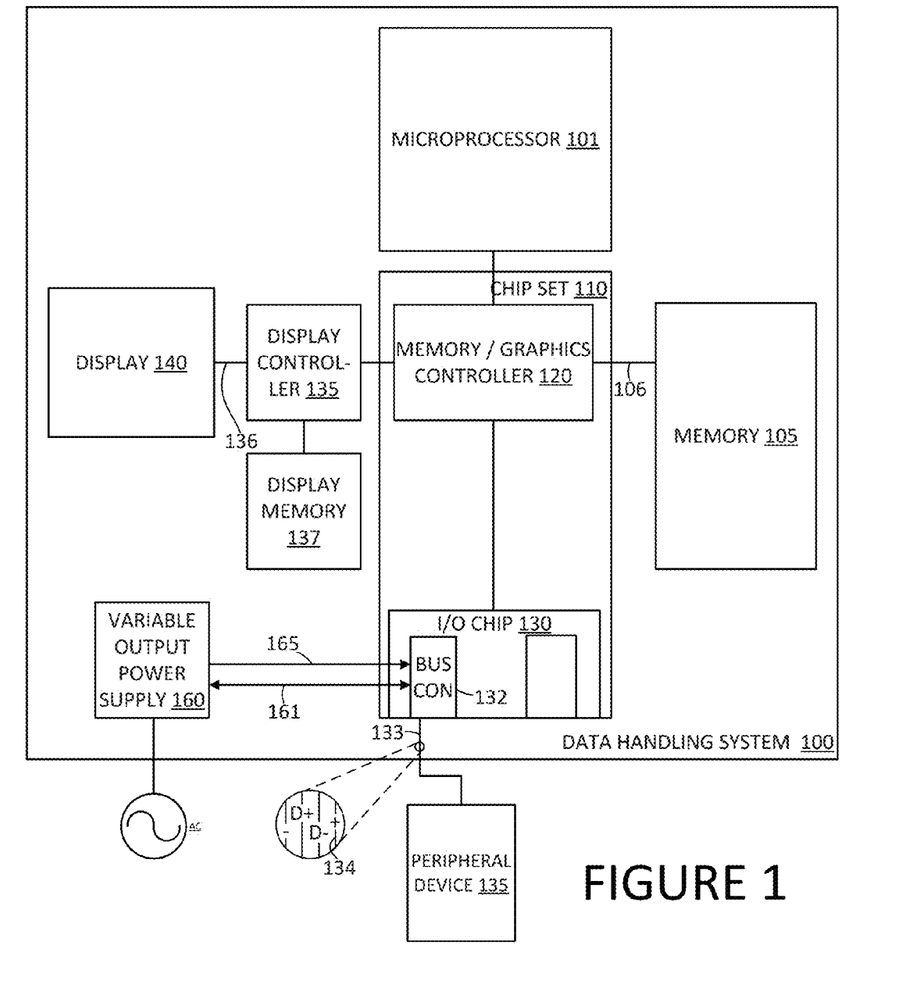
FIG. 1 illustrates a block diagram of an example information handling system, in accordance with embodiments of the present disclosure.

FIG. 1 illustrates, in block diagram, a data handling system 100 that employs a power supply with a limit circuit as described herein or analogous functionality. The data handling system 100 illustrated in FIG. 1 includes a processor 101 coupled to a peripheral device 135 by way of a peripheral bus 133 controlled by a bus controller 132. The illustrated bus controller 132 is coupled to variable output power supply 160, which provides a supply voltage 165 to bus controller 132. Bus controller 132 may couple supply voltage 165 to a supply interconnect 134 of peripheral bus 133.

The illustrated bus controller 132 and variable output power supply 160 may negotiate or communicate via power supply control bus 161 to determine the particular supply voltage 165 that variable output power supply 160 will generate. Variable output power supply 160 may be configured to generate any one of two or more supply voltages. In one non-limiting embodiment suitable for use in conjunction with a bus controller implementing a universal serial bus in compliance with the USB Power Delivery (USB-PD) specification, variable output power supply 160 and bus controller 132 may negotiate or otherwise communicate to identify any one of three different available supply voltages including 5 V, 12 V, and 20 V supply voltages.

The variable output power supply 160 illustrated in FIG. 1 is an AC to DC converter that receives a main supply voltage or another AC signal and generates a DC supply voltage 165. In other embodiments, variable output power supply 160 may receive a DC voltage generated by a battery (not shown) or a different power supply or voltage regulator (now shown). Variable output power supply 160 is illustrated in FIG. 1 communicating with only one bus controller 132 and providing only a single supply voltage output. Embodiments of variable output power supply 160 may generate multiple independent supply voltage signals for any one or more of a variety of bus controllers implementing various bus protocols or standards, any one or more of which may be a "variable output" signal if supported by the applicable standard or protocol. In addition, while variable output power supply 160 is illustrated in FIG. 1 providing supply voltage 165 to peripheral devices, embodiments of variable output power supply 160 may provide supply voltages for additional components and subsystems of data handling system 100 including as non-limiting examples, a memory array supply voltage, a processor supply voltage, and a display device supply voltage.

The illustrated bus controller 132 may be one of multiple bus controllers supported by an I/O chip 130 of a 2-chip chip set 110. The illustrated I/O chip 130 is coupled to a memory/graphics controller 120 of chip set 110. The memory/graphics controller 120 illustrated in FIG. 1 is coupled to a main memory 105 via a memory bus 106 and coupled to a display 140 via an intervening display controller 135 and a dedicated graphics bus 136. The display controller 135 is shown in FIG. 1 coupled to a dedicated display memory 137.

The elements of data handling system 100 illustrated in FIG. 1 are exemplary of various types of information handling systems including, as non-limiting examples, desktop and laptop computers. Other types of information handling systems may include additional, fewer, or different elements or devices than the elements and devices shown in FIG. 1. In addition, although FIG. 1 illustrates a chip set 110 in a traditional 2-chip north bridge/south bridge configuration, chip set 110 may be implemented with more, fewer, or different devices than illustrated in FIG. 1 and functionality associated with two or more distinct elements illustrated in FIG. 1 may be integrated into a common device while elements of the illustrated memory/graphics controller 120 may be integrated into processor 101 or display controller 135.

Figure 2:
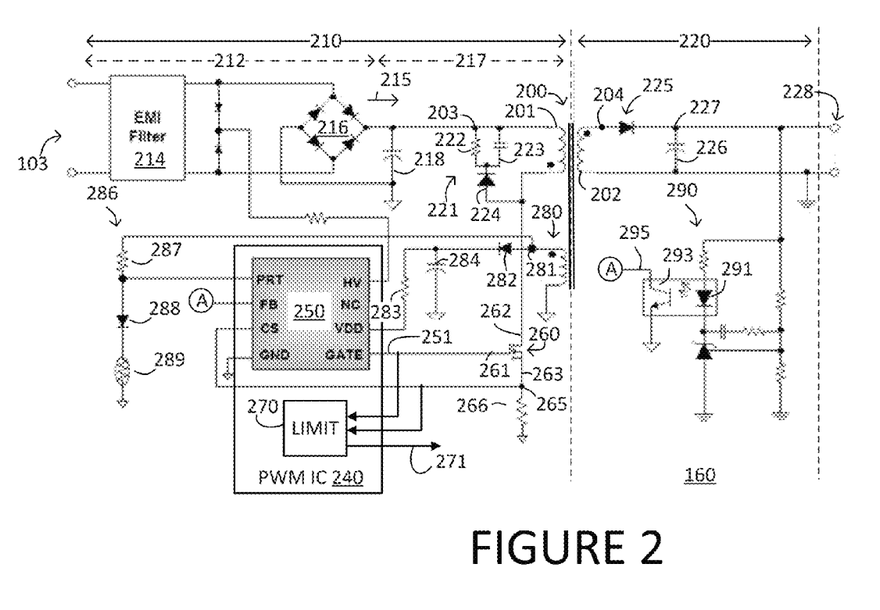
FIG. 2 illustrates a block diagram of an example variable output power supply, in accordance with embodiments of the present disclosure.

FIG. 2 illustrates an example variable output power supply 160. The variable output power supply 160 illustrated in FIG. 2 is a flyback converter power supply that includes an additive polarity transformer 200 that provides galvanic isolation between a transformer primary side 210, which is coupled to a primary winding 201 of transformer 200, and a transformer secondary side 220, which is coupled to a secondary winding 202 of transformer 200.

The transformer primary side 210 illustrated in FIG. 2 includes a rectification stage 212 that receives an AC input signal 103 and outputs a rectified signal 215. The illustrated rectification stage 212 includes an electromagnetic interference filter 214 and a diode bridge 216. EMI filter 214 may filter high-frequency noise associated with diode switching while otherwise preserving the AC input signal. Diode bridge 216 rectifies AC input signal 103 to produce rectified signal 215.

The transformer primary side 210 of the variable output power supply 160 illustrated in FIG. 2 further includes a DC stage 217 that receives the rectified signal 215 from rectification stage 212. The illustrated DC stage 217 applies the rectified signal 215 across a bulk capacitor 218 coupled between ground and a primary DC node 203 that is coupled to an upper electrode of primary winding 201. A low pass filter 221 comprised of a resistor 222 in parallel with a capacitor 223 is coupled in series with a diode 224 across the primary winding 201. Low pass filter 221 provides high frequency attenuation of any ripple components in the rectified signal 215 while diode 224 prevents the formation of a current path bypassing primary winding 201.

The transformer secondary side 220 illustrated in FIG. 2 includes a secondary winding 202 coupled to a rectifying diode 225 and an output capacitor 226. The rectifying diode 225 is shown with its anode coupled to an upper electrode of secondary winding 202 at a secondary DC node 204 and its cathode coupled to an output node 227 of power supply output port 228. Output capacitor 226 is coupled in parallel with output port 228.

The variable output power supply 160 illustrated in FIG. 2 is a switch mode power supply driven by a pulse width modulation (PWM) integrated circuit (IC) 240 that includes a PWM controller 250 and a limit circuit 270. The PWM controller 250 illustrated in FIG. 2 is configured to generate a periodic switching signal 251 and provide the switching signal 251 to a control electrode 261 of a switching transistor 260. Switching transistor 260 is configured to either prevent or permit current flow in primary winding 201 in accordance with the switching signal 251.

The switching transistor 260 illustrated in FIG. 2 is an n-channel metal-oxide semiconductor (NMOS) transistor that includes a gate electrode as its control electrode 261 and a drain electrode and source electrode as its output electrodes 262 and 263. Other embodiments of variable output power supply 160 may employ a p-channel MOS (PMOS) switching transistor, a complementary MOS (CMOS) switching transistor gate that includes an NMOS transistor and a PMOS transistor, a bipolar junction transistor, or another suitable switching device.

Switching transistor 260 is shown with its output electrode 262 coupled to a lower electrode of primary winding 201 and its output electrode 263 coupled to a node referred to herein as sense node 265. A resistor referred to herein as sense resistor 266 is illustrated in FIG. 2 coupled between the sense node 265 and ground.

As illustrated in FIG. 2, assertion of switching signal 251 by PWM controller 250 activates switching transistor 260 and establishes a low impedance path between the switching transistor output electrodes 262 and 263, thereby enabling the flow of a primary winding current, IP. Thus, for the NMOS example of switching transistor 260 illustrated in FIG. 2, the primary winding current IP equals or substantially equals the source-drain current, Ids, of switching transistor 260 and, ignoring a presumably insignificant current drawn by a sense voltage input, CS, of PWM controller 250, all or substantially all of the source-drain current Ids flows through sense resistor 266 to ground. Accordingly the sense node voltage Vcs is a direct indicator of the switching transistor Ids and the primary winding current IP as follows:

$$Vcs=Ids/Rs=IP/Rs$$

where Rs represents the resistance of sense resistor 266 and the equal signs are understood to ignore leakage currents, stray capacitances, and other non-ideal characteristics of the illustrated circuitry.

The PWM controller 250 illustrated in FIG. 2, in which sense node 265 is coupled to the current sense input CS of PWM controller 250, is configured to monitor the switching transistor Ids and the primary winding current IP via the sense node voltage Vcs.

In at least one embodiment, the limit circuit 270 of PWM IC 240 monitors, via the sense node voltage Vcs, the primary winding current IP as a proxy for the output current Iout and compares a value derived from the primary current IP against a limit threshold that correlates to a particular Iout threshold. Limit circuit 270 may generate a limit signal 271 indicating the result of the comparison such that an over current condition is signaled by the limit signal 271.

In accordance with embodiments of the present disclosure, limit circuit 270 may determine the state of limit signal 271 by sampling the sense node voltage Vcs at a particular juncture of the switching signal's switching period, determining or otherwise obtaining a duration of the transformer's demagnetizing interval, Tdem, modulating the sampled value of Vcs based on Tdem to obtain a limit proxy, and comparing the limit proxy to a limit reference. Because at least some pervasive and emerging peripheral bus protocols that support two or more supply voltages, including as one non-limiting example, USB PD, specify a maximum output power that scales with the supply voltage, limit signal 271 may simultaneously and beneficially signal an over current condition and an over power condition based on just two sensed inputs, neither of which references the output voltage Vout and both of which are "primary side parameters", i.e., parameters detectable within the primary side 210 of transformer 200.

By determining the limit signal 271 based on primary side parameters only, limit circuit 270 may be integrated with a conventional PWM controller, either within the same integrated circuit or as application specific logic coupled to a conventional PWM controller. The PWM IC 240 illustrated in FIG. 2 illustrates limit circuit 270 and PWM controller 250 within a single integrated circuit, with limit circuit 270 configured to receive, as its inputs, the switching signal 251 from PWM controller 250 and the sense node voltage Vcs and further configured to generate limit signal 271 to signal a condition that indicates the output current Iout exceeding an output current threshold, e.g., an output current maximum value.

The PWM controller 250 illustrated in FIG. 2 may employ features and functionality analogous to features and functionality of any one of various commercially distributed and widely available PWM controllers, which are commonly employed for low and medium power switch mode power supplies. Although specific signals and features of PWM controller 250 are illustrated in FIG. 2 and described below, embodiments of variable output power supply 160 may employ a PWM controller with different specific features and signals.

The PWM controller 250 of FIG. 2 receives a supply voltage from an auxiliary winding 280 of transformer 200. The auxiliary winding 280 is illustrated implemented with additive polarity and coupled between ground and an auxiliary node 281. Auxiliary node 281 is coupled to a VDD input of PWM controller 250 through a rectifying circuit that includes a resistor 283 and a diode 282 configured to charge a storage capacitor 284 during Toff intervals, which may also be referred to herein as Toff phases, of switching signal 251, i.e., intervals or phases within a switching period, Ts, of switching signal 251 during which the output impedance of switching transistor 260 is open or very high, e.g., exceeding 1 MΩ, while storage capacitor 284 provides the supply voltage during Ton phases of switching signal 251.

Auxiliary node 281 is illustrated in FIG. 2 further coupled to a PRT input of PWM controller 250 via a resistive divider circuit 286 that includes a resistor 287, a diode 288, and a temperature-controlled resistor or thermistor 289. The voltage sensed at PRT input may be used to provide over temperature protection and overvoltage protection.

An FB input of the depicted PWM controller 250 receives a feedback signal 295 from an output sensing circuit 290 on the transformer secondary side 220. The FB input of PWM controller 250 may influence a duty cycle of the switching signal 251 or other parameters. The output sensing circuit 290 illustrated in FIG. 2 preserves galvanic primary-secondary isolation by employing light emitting diode 291 in proximity to an optically activated switch 293. The voltage of the PWM controller FB input varies with the LED current which, in turn, varies with the output voltage Vout so that the FB input is indicative of Vout.

The CS input of PWM controller indicates the primary winding current IP as described previously. The CS input, like the FB input, may influence the duty cycle or other characteristics of switching signal 251.

Figure 3:
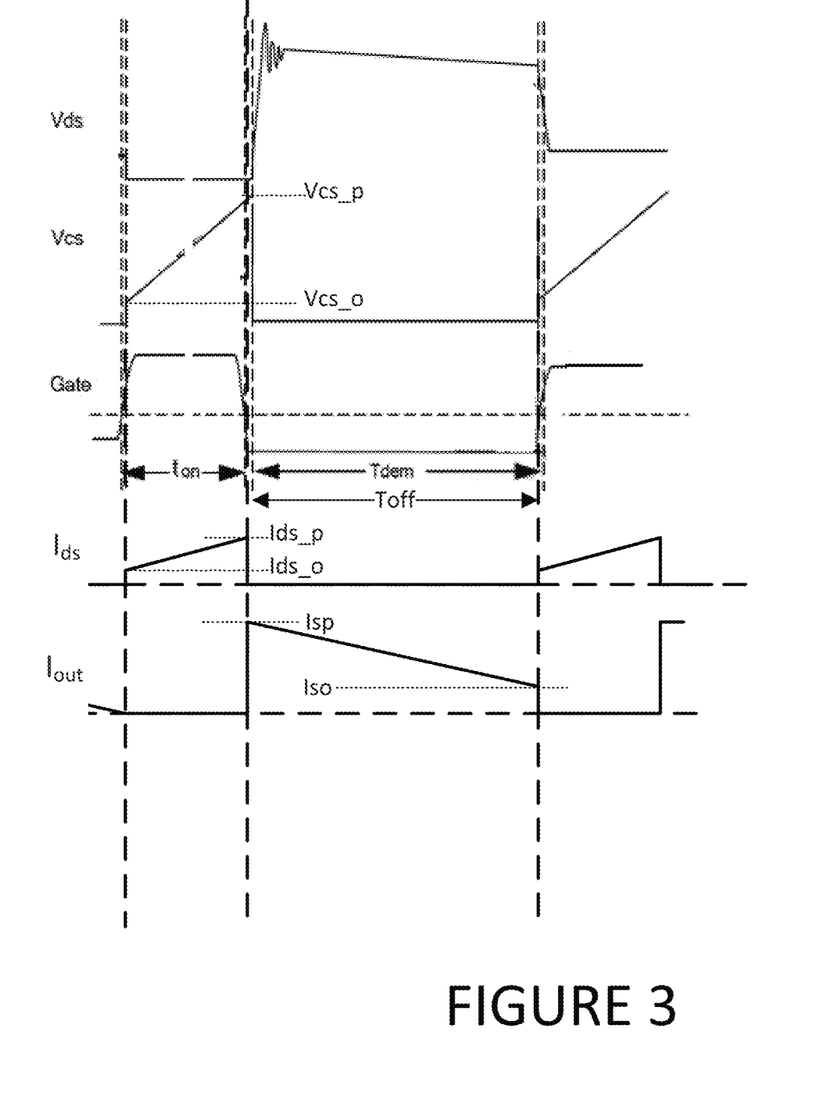
FIG. 3 illustrates exemplary selected signals that may be provided to or generated by a variable output power supply operating in a continuous current mode, in accordance with embodiments of the present disclosure.

FIG. 3 illustrates example voltage and current signals generated within variable output power supply 160. The signals illustrated in FIG. 3, which include three voltage signals and two current signals, reflect the behavior of variable output power supply 160 during CCM operation.

The three voltage signals illustrated in FIG. 3 include a Vds signal indicating the voltage across output electrodes 262 and 263 of the NMOS example of switching transistor 260, a Vcs signal indicating the voltage across sense resistor 266 of FIG. 2, and a VG or gate signal indicating the switching signal 251 output from the gate pin of PWM controller 250 and provided to the gate electrode 261 of switching transistor 260.

The two current signals illustrated in FIG. 3 include Ids and Iout. Ids represents the source-drain current flowing between output terminals 262 and 263 of switching transistor 260, which is equal to the primary winding current IP. For purposes of describing FIG. 3 and FIG. 4, references to Ids may be understood as referring to the primary winding current and vice versa. The output current Iout represents the current provided to a load (not explicitly depicted in FIG. 2) coupled to output port 228. Since Vout is a DC voltage the output capacitor drawings zero or de-minimis steady state current and Iout equals or substantially equals the secondary winding current, IS (the current flowing through secondary winding 202). For purposes of describing FIG. 3 and FIG. 4, references to Iout may be understood as referring to the secondary winding current and vice versa.

Qualitatively, FIG. 3 illustrates a mode of operation in which PWM controller 250 asserts switching signal 251 for a first interval or phase, referred to herein as the Ton phase, at the beginning of each switching period Ts. Switching signal 251 is then deasserted for a second phase referred to herein as the Toff phase. Ignoring rise and fall times of switching signal 251, the switching period Ts, which corresponds to a switching frequency, f, where Ts=1/f, equals the sum of Ton and Toff.

Embodiments of variable output power supply 160 employing an NMOS transistor as switching transistor 260 assert switching signal 251 by forcing the control electrode 261 to a positive voltage exceeding the switching transistor's threshold voltage. Conversely, de-asserting switching signal 251 refers to forcing the control electrode 261 to ground or another voltage that is less than the switching transistor threshold voltage. Other embodiments may require signals of opposite polarity, different magnitude, or both.

The CCM operation illustrated in FIG. 3 may be recognizable by the finite, non-zero value, Ids_o, of primary winding current at the beginning of each Ton phase and a finite, non-zero value, Iso, of output current Iout, at the end of each Toff phase.

During each Ton phase, Ids increases linearly or substantially so from its initial value Ids_o to its peak value Ids_p at the end of the Ton phase. Similarly, the sense voltage Vcs, which tracks Ids in accordance with Ohm's law, increases linearly or substantially so from its initial value Ids_o to its peak value Ids_p at the end of each Ton phase.

After switching signal 251 is de-asserted at the beginning of Toff, Ids drops to zero and Vds jumps up to a peak value before settling and then decreasing linearly or substantially linearly for the remainder of Toff. At the beginning of each Toff phase, Iout obtains a peak value Isp and decreases linearly thereafter from Isp to Iso at the end of Toff. The slope of the Ids signal during Ton is proportional to the ratio of the voltage across primary winding 201 and inversely proportional to the primary winding inductance. Similarly, the slope of Iout during Toff is proportional to the voltage across the secondary winding 202, which is substantially equal to Vout, and inversely proportional to the secondary winding inductance.

The instantaneous output power Pout is equal to the product of the output current Iout and the output voltage Vout. Similarly, the average output power Pout_avg equals the product of the Iout_avg and Vout_avg. For a power supply such as variable output power supply 160 that generates a DC output voltage, Vout_avg equals Vout and Pout_avg is directly proportional to Iout_avg.

During Ton, Iout is 0. During Toff, Iout decreases linearly from Isp to Iso and the average value of Iout during Toff is (Isp+Iso)/2. The average value for the entire switching period may be obtained by multiplying the average value of Iout during Toff by Toff/f, the percentage of the switching period during which this average value output current flows, yielding:

$$Iout = \frac{(Isp + Iso) * Toff}{2} * f \qquad \text{Equation 1}$$

where f is the switching frequency of switching signal 251. Equation 1 can be expressed in terms of the duty cycle D, which is defined as Ton/Ts, by noting that (Ton/Ts)+(Toff/Ts)=1, substituting D for Ton/Ts, and rearranging to obtain: Toff/Ts=1−D. Substituting 1−D for Toff/Ts in Equation 1 yields:

$$I_{OUT} = \frac{(Isp + Iso) * (1 - D)}{2} \qquad \text{Equation 2}$$

The secondary side parameters Isp and Iso may be converted to primary side parameters Ids_p and Ids_o via the turns ratio, n, of transformer 200, as follows:

$$Isp+Iso=n(Ids\_p+Ids\_o) \qquad \text{Equation 3}$$

where n is the ratio of secondary winding turns to primary winding turns. Substituting the right side of Equation 3 into the Isp+Iso term in Equation 2 yields:

$$Iout = \frac{n * (Ids\_p + Ids\_o) * (1 - D)}{2} \qquad \text{Equation 4}$$

Expressing equation 4 in terms of Toff and the switching frequency, f, yields:

$$Iout = \frac{n * (Ids\_p + Ids\_o) * Toff}{2} * f \qquad \text{Equation 5}$$

Iout can then be expressed in terms of the sense node voltage Vcs as follows:

$$Iout = \frac{n * (Vcs\_p + Vcs\_o) * Toff}{2 * Rs} * f \qquad \text{Equation 6}$$

Equation 6 expresses a parameter to be monitored, Iout, according to the primary side parameters Vcs, Rs, Toff, and f, and expresses the parameter to be monitored without reference to the output voltage Vout. A limit circuit 270 that receives the sense voltage Vcs and the switching signal 251 can determine Toff and set a limit for Iout for any values of n and Rs without sensing or otherwise obtaining the specific output voltage Vout. The USB PD specification, as one non-limiting example, defines five power profiles and supports three supply voltages: 5 V, 12 V, and 20 V. Because each of the USB PD profiles corresponds to a particular maximum output current, variable output power supply 160 may set a single limit threshold that will accommodate any output voltage supported by the profile. For example, USB PD profile 5 encompasses 12 V and 20 V supply voltages and specifies a 5 A limit, which translates to a power limit of 60 W for 12 V operation and 100 W for 20 V operation.

By setting the limit threshold 271 to trigger at Iout greater than or equal to 5 A, variable output power supply 160 provides power and current protection simultaneously for all profile-compliant configurations.

Figure 4:
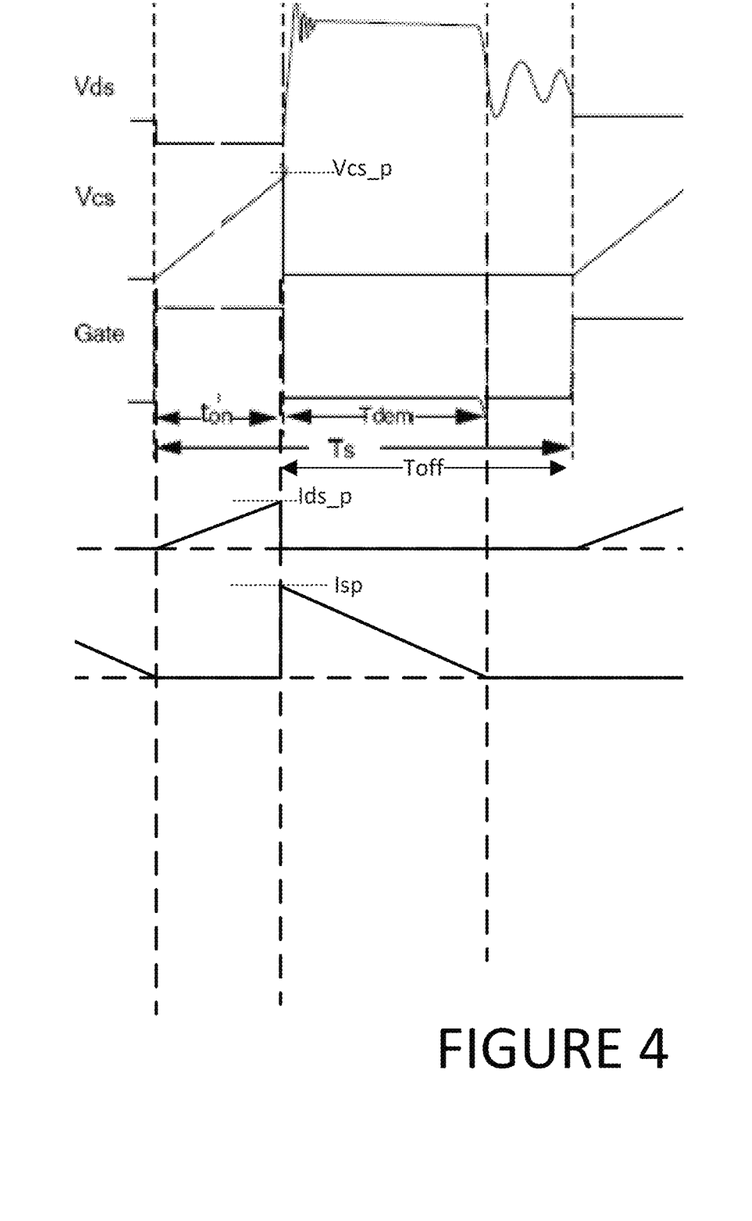
FIG. 4 illustrates exemplary selected signals that may be provided to or generated by a variable output power supply operating in a discontinuous current mode, in accordance with embodiments of the present disclosure.

FIG. 4 illustrates DCM operation of the power supply using the same signals as FIG. 3. DCM operation is characterized by zero energy in the transformer windings, i.e., zero transformer winding current, at the beginning and end of each switching period. In DCM mode, the sense node voltage Vcs and Ids both increase linearly during Ton from 0 to peak values Vcs_p and Ids_p respectively at the end of Ton. When switching signal 251 is deasserted, Ids drops to zero and the output current Iout jumps from zero to a peak value Isp, after which Iout decreases linearly for the remainder of an interval commonly referred to as the demagnetizing interval and denoted in FIG. 4 as Tdem. At the end of Tdem, the output current has dropped from Isp to 0 and the transformer inductors are depleted of energy. At the point where the secondary winding energy is first fully dissipated, sometimes referred to as the "knee" point, the Vds of switching transistor 260 drops suddenly. Due to capacitive coupling between the gate and drain of switching transistor 260, the voltage on the gate electrode drops below 0 V, i.e., negative voltage, at the end of Tdem before stabilizing. In at least one embodiment, limit circuit 270 may be configured to detect the end of the demagnetizing interval during DCM operation by monitoring for the gate electrode voltage dropping sufficiently below 0 V, i.e. The magnitude of the gate voltage drop at the knee point may vary among different implementations, but may be 100 mV or more in some embodiments i.e., the gate electrode voltage may drop to −100 mV or less.

Equation 6 expresses the average output current limit for CCM operation in terms of the peak and initial sense node voltages Vcs, the turns ratio n, the sense resistor resistance Rs, the switching frequency, f, and Toff. An analogous equation for DCM mode operation can be obtained by dropping the Vcs_o term of Equation 6 and substituting Tdem for Toff, resulting in:

$$Iout = \frac{n*(Vcs\_p)*Tdem}{2*Rs}*f \qquad \text{Equation 7}$$

Referring back to FIG. 3, FIG. 3 illustrates graphically that Iout may be represented in terms of a single value of Vcs and more specifically, the value of Vcs occurring at Ton/2, where Ton/2 represents the chronological midpoint of Ton. Similarly, FIG. 4 and Equation 7 illustrate that, for DCM operation, the same applies, i.e., Iout may be expressed in terms of the Vcs midpoint value, Vcs_m, which represents the value of Vcs at the point in time occurring Ton/2 into the switching period Ts. In at least one embodiment, limit circuit 270 implements this observation by determining the state of limit signal 271 based on a single sampled value of Vcs, the Ton/2 value of Vcs.

The PWM IC 240 illustrated in FIG. 2 includes limit circuit 270 configured to sample or otherwise obtain Vcs_m, the Ton/2 value of Vcs, and modulate or otherwise convert Vcs_m to derive a quantity or value referred to herein as a limit proxy, which can be compared to a limit reference to determine the state of limit signal 271 for indicating over current conditions, i.e., a value of Iout exceeding a particular limit threshold.

Figure 5:
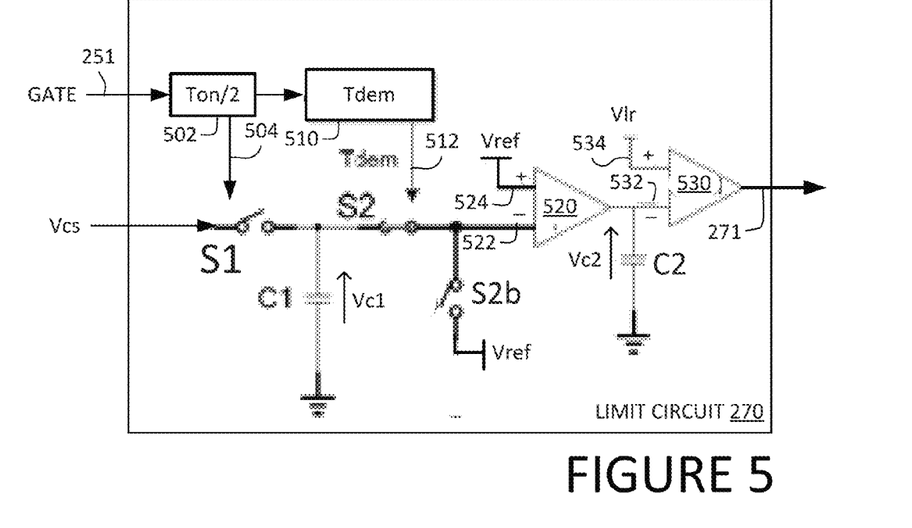
FIG. 5 illustrates a block diagram of an example limit circuit, in accordance with embodiments of the present disclosure.

FIG. 5 illustrates exemplary detail of a limit circuit 270 configured to receive switching signal 251 and the sense node voltage Vcs as its inputs. The illustrated limit circuit 270 includes a Ton/2 circuit 502 that generates Ton/2 signal 504 to control a first switch S1, a Tdem circuit 510 that generates a Tdem signal 512 to control a pair of switches S2 and S2b, a voltage controlled current source 520 and a comparator 530. Switches S1 and S2b may be normally open switches while S2 may be normally closed. Switches S2 and S2b may be logically complementary switches, wherein S2 closes when S2b opens and vice versa.

The illustrated limit circuit 270 couples the sense node voltage Vcs to sampling capacitor C1 when S1 is closed. In at least one embodiment, Ton/2 circuit 502, further described in FIG. 6, closes S1 at the beginning of a switching period, keeps S1 closed for a duration of Ton/2, and opens S1 for the remainder of the switching cycle. Because a portion of Ids may be needed to charge capacitor C1 after S1 is closed, some embodiments may select a C1 that results in an RC delay, Rs*C1, less than Ton/2 to ensure that, at Ton/2, substantially all of Ids flows through the sense resistor Rs so that, Vcs at Ton/2 is equal or substantially equal to Rs*Ids at Ton/2.

Figure 8:
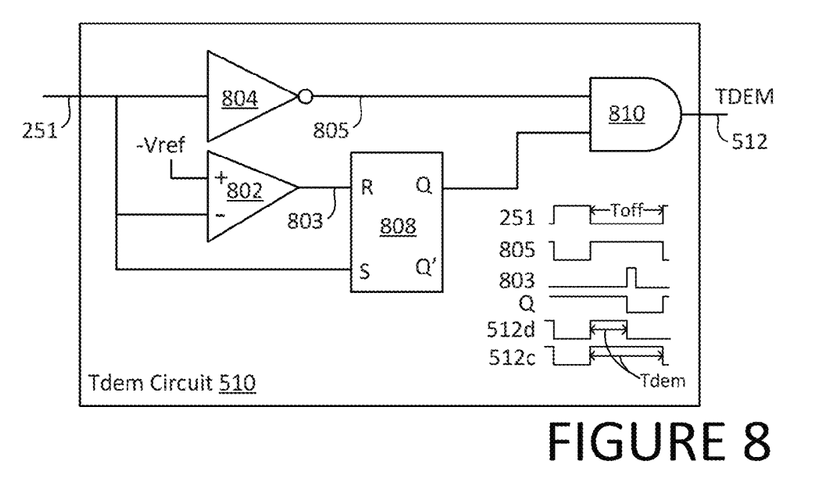
FIG. 8 illustrates a block diagram of a circuit configured to signal a demagnetizing interval.

The Tdem circuit 510 illustrated in FIG. 5, and further described with respect to FIG. 8, asserts Tdem signal 512 for a duration equal to the demagnetizing interval. The Tdem signal 512 controls switches S2 and S2b to couple the negative input 522 of a voltage controlled current source (VCCS) 520 either to reference capacitor C1 or to a reference voltage identified in FIG. 5 as limit reference voltage Vref to capacitor C1 to a reference voltage Vref apply the sampling capacitor voltage Vc1 to a negative input 522 of a voltage controlled current source (VCCS) 520. The positive input 524 of VCCS 520 is coupled to a limit reference voltage Vref. For the duration that S2 remains closed and switch S2b remains open, VCCS 520 sources a DC current in accordance with:

$$Ivccs=Gm*(Vref-Vc1)$$

where Gm represents an adjustable transconductance of VCCS 520. Because Tdem circuit 510 asserts Tdem signal 512 for a duration equal to demagnetizing interval, switch S2 remains closed and switch S2b remains open for a duration equal to Tdem thereby transferring an electric charge Q2 to reference capacitor C2 and raising Vc2 to a voltage referred to herein as the limit proxy voltage, Vlp, given by $$Vlp=Q2/C2$$

The limit proxy voltage Vlp, which represents the product of Tdem and Vcs_m, is indicative of the peak value of Iout and can be compared to a limit reference voltage Vlr, that correlates to Iomax, a specified maximum value of the output current Iout. FIG. 5 illustrates limit circuit 270 with a comparator 530 including a negative input 532 coupled to C2 and a positive input 534 coupled to a limit reference voltage, Vlr. Comparator 530 outputs limit signal 271, which indicates whether the limit proxy voltage, Vlp, is greater or less than the limit reference voltage Vlr.

By generating limit proxy voltage Vlp to be indicative of Vcs_m*Tdem, the illustrated limit circuit 270 is configured to assert limit signal 271 when Iout exceeds a limit threshold, i.e., exceeds a maximum specified value.

In this manner, the illustrated limit circuit 270 samples and stores Vcs_m in sampling capacitor C1 and then uses this voltage to deliver output current Ivccs to capacitor C2 for a duration equal to Tdem. By appropriate selection of capacitor values, reference voltages, and, Gm, the transconductance of VCCS 520, limit signal 271 provides a precise indicator of an over current condition in which Iout exceeding a specified maximum operating value.

Figure 6:
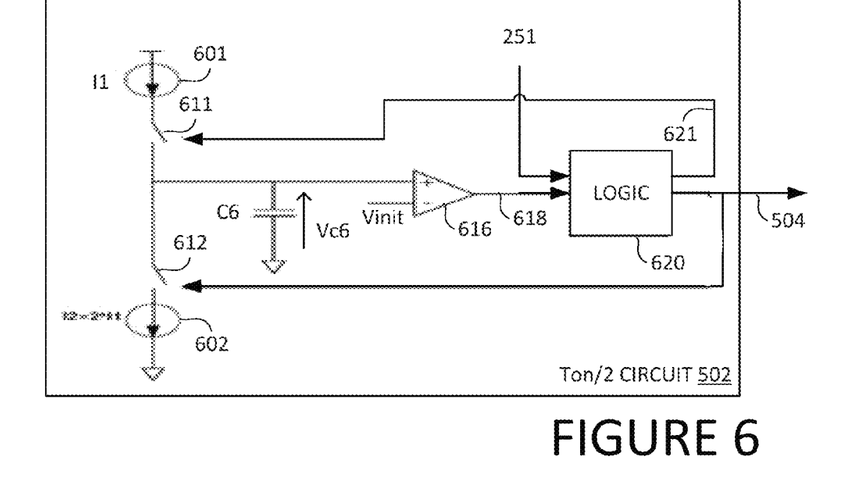
FIG. 6 illustrates a block diagram of an example circuit for determining a midpoint of a particular phase of a particular signal, in accordance with embodiments of the present disclosure.

FIG. 6 illustrates an example of the Ton/2 circuit 502 in FIG. 5. The Ton/2 circuit 502 illustrated in FIG. 6 receives switching signal 251 as its input and generates Ton/2 signal 504 to control switch S1 of the limit circuit 270 illustrated in FIG. 2 and FIG. 5. In at least one embodiment, Ton/2 circuit 502 includes two current sources 601 and 602, two switches 611 and 612, a capacitor C6, a comparator 616, and logic 620. Logic 620 is depicted receiving an output 618 of comparator 616 and switching signal 251 as its inputs and generating switch control signal 621 and Ton/2 signal 504 as its outputs. The illustrated Ton/2 circuit 502 uses switch control signal 621 to control switch 611 and Ton/2 signal 504, which is also provided to switch S1 of FIG. 5 as the output of Ton/2 circuit 502, to control switch 612.

In some embodiments, not depicted in FIG. 6, switching signal 251 serves as the switch control signal 621 and, in these embodiments, Ton/2 circuit 502 may couple switching signal 251 directly to switch 611 rather than routing the signal through logic 620. In some embodiments, logic 620 may suppress or disable switch control signal 621 during alternating switching cycles so that switch 611 remains open and switch control signal 621 may be generated by suppressing switching signal 251 during alternating switching periods. These alternative embodiments are described below with respect to FIG. 7. The following description of FIG. 6 assumes switch control signal 621 is equivalent to switching signal 251 unless noted otherwise.

When switch control signal 621 transitions at the beginning of a Ton phase, switch 611 closes and current source 601 provides a DC charging current, I1, to capacitor C6, thereby increasing the capacitor voltage, Vc6, from a zero or non-zero initial voltage, Vinit, at the beginning of the Ton phase, to a charged voltage, Vchg, at the end of Ton, at which point switch 611 opens, effectively storing Vchg as the capacitor voltage.

Switch 612, when closed, couples second current source 602 to capacitor C6. The second current source 602 of FIG. 6 is configured to discharge capacitor C6 by drawing a discharge current I2 from the capacitor. To generate a condition or signal that occurs at Ton/2, the magnitude of discharge current I2 may be selected to discharge capacitor C6 in half the time required to charge capacitor C6 with current source I1. The value of the discharge current I2 may depend upon the manner in which the control signal 621 for switch 611 is employed.

The Ton/2 circuit 502 may distinguish between charge cycles, which refer to switching periods during which the C6 capacitor voltage Vc6 rises from Vinit to Vchg due to charging current I1, and discharge cycles, which refer to switching periods during which Vc6 falls from Vchg to Vinit due to discharge current I2. Ton/2 circuit 502 may alternate charge cycles and discharge cycles wherein each charge cycle is preceded and followed by a discharge cycle and vice versa.

During discharge cycles, Ton/2 circuit 502 may cause Vc6 to decrease from Vchg to Vinit at twice the rate that Vc6 increased from Vinit to Vchg during charge cycles so that the c6 capacitor voltage Vc6 will fall to Vinit at Ton/2. The comparator 616 illustrated in FIG. 6 is configured to signal the moment at which Vc6 falls to Vinit during a discharge phase via output signal 618.

In some embodiments of Ton/2 circuit 502, the switching signal 251 serves as the switch control signal 621 that controls switch 611. In these embodiments, switch 611 will be activated at the beginning of each Ton phase of switching signal 251, including those Ton phases associated with discharge cycles. In these embodiments, the discharge current I2 must not only discharge capacitor C6 twice as fast as the charging current I1 charged it, the discharge current I2 must also negate the charging current I1. Thus, I2 must equal 3*I1 for embodiments in which the charging current switch 611 is asserted in each switching cycle.

In some embodiments, logic 620 may disable switch control signal 621 during discharge cycles. In these embodiments, the discharge current I2 required to cause comparator 616 to indicate Ton/2 equals 2*I1 and the additional logic required to suppress switch control signal 621 on alternating cycles is exchanged for the smaller I2 current source 602.

In some embodiments, the Ton/2 signal 504, which also controls discharge current switch 612, may be disabled during charge cycles so that switch 602 remains open and all of the charging current I1 from current source 601 contributes to the charging of capacitor C6.

Figure 7:
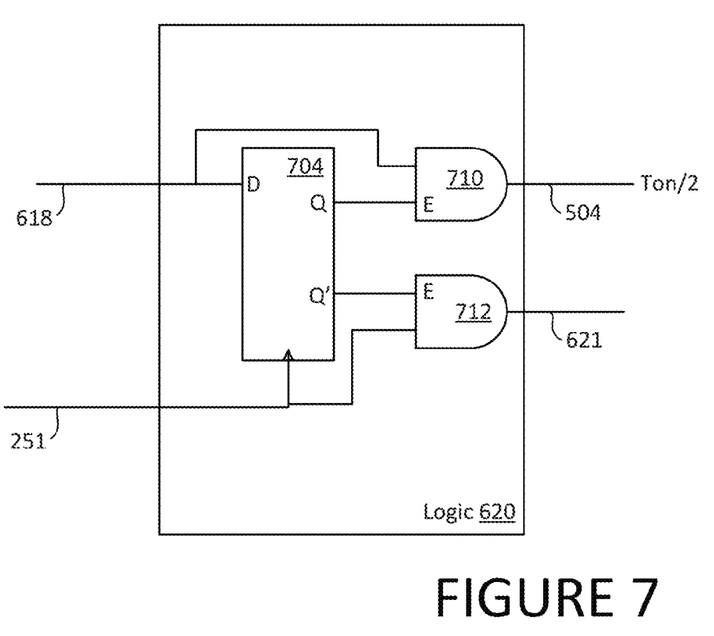
FIG. 7 illustrates a block diagram of a circuit configured to signal a midpoint of a particular phase of a switching signal.

FIG. 7 illustrates example logic 620 that generates switch control signal 621 and Ton/2 signal 504. The logic illustrated in FIG. 7 includes a latch 704 and logical AND gates 710 and 712. The logic 620 illustrated in FIG. 7 receives switching signal 251 and the output signal 618 of the FIG. 5 comparator 616. Comparator output signal 618 is coupled to a D input of latch 704, which is shown receiving switching signal 251 at a clock input.

The Q output of latch 704 reflects the value present at input D when switching signal 251 last transitioned low to high. Because the comparator output signal 618 indicates whether the voltage Vc6 of capacitor C6 is greater or less than a reference voltage, comparator output signal 618 indicates whether the capacitor C6 is charged or not.

A logical 1 at output Q of latch 704 following a transition of switching signal 251 indicates a discharge cycle while a logical 0 indicates a charge cycle. When the Q output indicates a discharge cycle, AND gate 710 is enabled and the output of AND gate 710, the Ton/2 signal 504 follows comparator output signal 618. When the Q output of latch 704 indicates a charge cycle, AND gate 710 is disabled and Ton/2 signal 504 remains low.

A logical 1 at output Q' of latch 704 following a transition of switching signal 251 indicates a charge cycle while a logical 0 at Q' indicates a discharge cycle. When the Q' output indicates a charge cycle, AND gate 712 is enabled and the output of AND gate 712, the switching control signal 621 of FIG. 6 follows switching signal 251.

The logic 620 described is suitable for embodiments in which switch 611 of FIG. 6 is disabled during discharge cycles and enabled during charge cycles and in which switch 621 of FIG. 6 is disabled during charge cycles and enabled during discharge cycles.

FIG. 8 illustrates an example Tdem circuit 510 for generating the Tdem signal 512 of FIG. 5. The illustrated Tdem circuit 510 is implemented with logic that recognizes the falling edge of switching signal 251, i.e., the beginning of the Toff phase, as the beginning of Tdem. Tdem circuit 510 also recognizes either of two triggers or events indicating the end of Tdem. One trigger occurs at the end of the Toff phase, when switching signal 251 transitions from low to high. This trigger identifies the end of Tdem in CCM operation. Another trigger, associated with DCM operation, occurs when switching signal 251 exhibits a transitory negative voltage pulse of an appreciable magnitude at an intermediate point in the Toff phase. The transitory pulse occurs when Vds buckling of switching transistor 260 at the DCM knee point familiar to those of skill in the field of switch mode voltage converters, is capacitively coupled to the switching transistor gate electrode. In some embodiments, a peak voltage of the gate electrode knee point voltage drop is in the range of approximately −100 to −500 mV with a duration in the range of 0.1 to 1 milliseconds. In other embodiments, the peak voltage and the duration may be of greater or lesser magnitude.

The Tdem circuit 510 illustrated in FIG. 8 generates the Tdem signal 512 with a comparator 802 that generates a comparator output 803, a logical inverter 804 that generates an inverter output 805, an R-S latch 808 and a logical AND gate 810. Logical inverter 804 inverters switching signal 251 and provides the inverted switching signal as its output 805 to an input of AND gate 810. The Tdem signal 512 generated at the output of AND gate 810 will follow the inverted switching signal unless the Q output of latch 808 is low. A set input, S, of the depicted latch 808 is coupled to switching signal 251 and a reset input, R, is coupled to receive comparator output signal 803 from comparator 802.

Comparator 802 is configured to receive a negative value reference voltage, −Vref, at its positive input and switching signal 251 at its negative input. Configured as illustrated in FIG. 8, comparator output 803 is normally low and is asserted only during the previously described knee point voltage drop of switching signal 251, when the switching transistor gate electrode voltage temporarily becomes more negative than −Vref.

Example waveforms illustrate operation of Tdem circuit 510. The Q output of latch 808 is set high at the beginning of each switching cycle by the switching signal 251 at the latch's S input. The latch's Q output remains high unless comparator output 803 is asserted at the knee point voltage drop within a DCM switching cycle. Accordingly, the Tdem signal 512 at the output of AND gate 810 follows the inverted switching signal at inverter output 805 unless and until a knee point voltage drop occurs, at which point comparator output signal 803 pulses high for a brief duration, thereby resetting the Q output of latch 808, which will be latched low until the set input S transitions from low to high at the beginning of the subsequent switching cycle. Example waveforms illustrating the behavior of Tdem circuit 510 are illustrated within FIG. 8.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
   a processor;
   a memory device coupled to the processor;
   a bus controller coupled to the processor and configured to support communication with a peripheral device via a peripheral bus; and
   a switch mode power supply coupled to the bus controller, wherein the switch mode power supply includes:
      a controller configured to generate a switching signal having a switching period comprising an on phase and an off phase;
      a switching transistor including:
         a control electrode configured to receive the switching signal; and
         first and second output electrodes configured to form a current path, in accordance with the control electrode, between a transformer primary winding and a sense node;
      a sense resistor coupled to the sense node; and
      a limit circuit configured to:
         close a charging switch to couple the sense node to a first node of a sense capacitor during a first on phase;
         sample a sense node voltage, comprising a voltage of the sense node, at a midpoint of the first on phase; and
         close a discharging switch to couple a discharging current source to the sense capacitor during a first half of a second on phase.

2. The information handling system of claim 1, wherein the limit circuit includes a midpoint circuit configured to open the discharging switch during the first on phase and open the charging switch during the second on phase and wherein a magnitude of a charging current is one half of a magnitude of a discharging current.

3. The information handling system of claim 2, wherein the midpoint circuit includes a latch configured to:
   generate a discharge cycle signal indicative of the sense capacitor voltage exceeding a particular threshold at a switching signal transition corresponding to a beginning of a switching period; and
   generate a charging cycle signal indicative of the sense capacitor voltage below a particular threshold at the switching signal transition.

4. The information handling system of claim 1, wherein a midpoint circuit is configured to close the charging switch during the second on phase and wherein a magnitude of a charging current is one third of a magnitude of a discharging current.

5. The information handling system of claim 1, wherein the limit circuit is configured to apply the sense node voltage to an input of a voltage-controlled current source.

6. The information handling system of claim 1, wherein the limit circuit includes a demagnetizing circuit configured to signal a beginning of a demagnetizing interval responsive to detecting a transition of the switching signal at an end of the first on phase.

7. The information handling system of claim 6, wherein the demagnetizing circuit is configured to signal an end of the demagnetizing interval corresponding to a first occurring of two events, the two events comprising:
   a discontinuous current mode end event comprising a negative transition of a switching transistor control electrode voltage; and
   a continuous current mode end event comprising a transition of the switching signal at an end of an off phase.

8. The information handling system of claim 1, further comprising:
   a rectification stage configured to:
      receive an AC voltage; and
      produce a rectified voltage; and
   a DC stage coupled between the rectification stage and the primary winding of the transformer.

9. The information handling system of claim 1, wherein the controller comprises a pulse width modulator controller configured to control a duty cycle of the switching signal.

10. The information handling system of claim 1, further comprising:
   a flyback circuit configured to couple a signal indicative of an output voltage to the controller.

11. A switch mode power supply, comprising:
   a controller configured to generate a switching signal having a switching period comprising an on phase and an off phase;
   a switching transistor including:
      a control electrode configured to receive the switching signal; and
      first and second output electrodes configured to form a current path, in accordance with the control electrode, between a transformer primary winding and a sense node;
   a sense resistor coupled to the sense node; and
   a limit circuit configured to:
      close a charging switch to couple the sense node to a first node of a sense capacitor during a first on phase;
      sample a sense node voltage, comprising a voltage of the sense node, at a midpoint of the first on phase; and
      close a discharging switch to couple a discharging current source to the sense capacitor during a first half of a second on phase.

12. The switch mode power supply of claim 11, wherein the limit circuit includes a midpoint circuit configured to open the discharging switch during the first on phase and open the charging switch during the second on phase and wherein a magnitude of the charging current is one half of a magnitude of the discharging current.

13. The switch mode power supply of claim 12, wherein the midpoint circuit includes a latch configured to:
   generate a discharge cycle signal indicative of a sense capacitor voltage exceeding a particular threshold at a switching signal transition corresponding to a beginning of a switching period; and
   generate a charging cycle signal indicative of the sense capacitor voltage below a particular threshold at the switching signal transition.

14. The switch mode power supply of claim 11, wherein the midpoint circuit is configured to close the charging switch during the second on phase and wherein a magnitude of the charging current is one third of a magnitude of the discharging current.

15. The switch mode power supply of claim 11, wherein the limit circuit is configured to apply the sense node voltage to an input of a voltage-controlled current source.

16. The switch mode power supply of claim 11, wherein the limit circuit includes a demagnetizing circuit configured to signal a beginning of a demagnetizing interval responsive to detecting a transition of the switching signal at an end of the first on phase.

17. The switch mode power supply of claim 16, wherein a demagnetizing circuit is configured to signal an end of the demagnetizing interval corresponding to a first occurring of two events, the two events comprising:
   a discontinuous current mode end event comprising a negative transition of a switching transistor control electrode voltage; and
   a continuous current mode end event comprising a transition of the switching signal at an end of the off phase.

18. The switch mode power supply of claim 11, further comprising:
   a rectification stage configured to:
      receive an AC voltage; and
      produce a rectified voltage; and
   a DC stage coupled between the rectification stage and the primary winding of the transformer.

19. The switch mode power supply of claim 11, wherein the controller comprises a pulse width modulator controller configured to control a duty cycle of the switching signal.

20. The switch mode power supply of claim 11, further comprising:
   a flyback circuit configured to couple a signal indicative of an output voltage to the controller.

* * * * *